(12) United States Patent
Yoshizawa

(10) Patent No.: US 8,199,366 B2
(45) Date of Patent: Jun. 12, 2012

(54) IMAGE READING APPARATUS AND IMAGE PROCESS METHOD

(75) Inventor: Masanori Yoshizawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 978 days.

(21) Appl. No.: 12/188,917

(22) Filed: Aug. 8, 2008

(65) Prior Publication Data

US 2009/0067009 A1  Mar. 12, 2009

(30) Foreign Application Priority Data

Sep. 12, 2007  (JP) ................... 2007-236784

(51) Int. Cl.
*H04N 1/40* (2006.01)
*H04N 1/407* (2006.01)
*G03F 3/08* (2006.01)

(52) U.S. Cl. ....... 358/3.23; 358/3.26; 358/518; 358/461

(58) Field of Classification Search .............. 358/3.23, 358/474, 461, 400, 1.9, 3.26, 462, 408, 448, 358/496, 515, 518; 347/129, 112, 111
See application file for complete search history.

(56) References Cited

U.S. PATENT DOCUMENTS 7,619,785 B2 * 11/2009 Sodeura et al. ............... 358/474

FOREIGN PATENT DOCUMENTS

| JP | 2003-333327 A | 11/2003 |
| JP | 2004-193743 | 7/2004 |
| JP | 2004-371072 A | 7/2006 |
| JP | 2007-336455 A | 12/2007 |

OTHER PUBLICATIONS

Office Action dated Sep. 6, 2011 issued in Japanese Priority Application No. 2007-236784, with English translation.

* cited by examiner

*Primary Examiner* — Charlotte M Baker
(74) *Attorney, Agent, or Firm* — Finnegan, Henderson, Farabow, Garrett & Dunner, L.L.P.

(57) ABSTRACT

Disclosed is an image reading apparatus which reads images in a front side and a back side of a document by passing the document through the image reading apparatus once including a first reading section to read the front side of the document, a second reading section to read the back side of the document and an image process section to calculate a first standard value for carrying out a first shading correction to the first reading section and a second standard value for carrying out a second shading correction to the second reading section, respectively, and to carry out the first shading correction to a first image data read by the first reading section based on the calculated first standard value and to carry out the second shading correction to a second image data read by the second reading section based on the calculated second standard value.

6 Claims, 18 Drawing Sheets

IMAGE READING APPARATUS AND IMAGE PROCESS METHOD

BACKGROUND OF THE INVENTION

1. Field of the Invention

The present invention relates to an image reading apparatus such as a scanner and an image process method, and particularly to an image reading apparatus and an image process method to carry out a shading correction to a read image.

2. Description of Related Art

The reading section to read an image of a document comprises a solid-state image pickup element to convert the light source to irradiate light to the document and the amount of the reflection light which is reflected by the document image into electric signal as the main component.

It is known that both sides of a document can be read simultaneously by disposing two of the reading sections at opposing positions by sandwiching the document so as to be a pair of reading sections (hereinafter, a reading section to read the front side of the document is called the first reading section and a reading section to read the back side is called the second reading section).

When the image reading apparatus reads both sides of the document, the document is irradiated by the light source and the document image is read by the solid-state image pickup element. When the light sources provided at the image reading apparatus are both lit, the pixel value becomes greater than the pixel value when the reading is carried out by either one of the first reading section or the second reading section because of the transmitted light from the surface which is the opposite side of the document reading surface. As a result, the pixel value in the high brightness side is saturated and there is a problem that the tone property of the read data is impaired.

There is disclosed a technique to avoid the influence of the transmitted light from the opposite side (JP2004-193743, hereinafter called "patent document 1").

In patent document 1, there is disclosed a technique to improve the tone property in the high brightness side of both reading sections by setting the standard value of the shading correction in the first reading section and the second reading section so as to be the same value according to the paper quality. That is, in the example of the patent document, the standard value is set so as to be relatively high because the influence of the transmitted light is small when a thick paper is used, and the standard value is set so as to be relatively low because the influence of the transmitted light is great when a thin paper is used. In such manner, the influence of the transmitted light from the opposite side due to the paper type is avoided.

However, in the technique of patent document 1, there is a case where an appropriate shading correction is not carried out by not being able to respond to the difference caused by the property of the first reading section and the second reading section because the same standard values are set for the first reading section and the second reading section.

FIG. 17 is an enlarged diagram of proximity of the document passing surface of the first reading section, and FIG. 18 is an enlarged diagram of proximity of the document passing surface of the second readings section. FIG. 17 shows a document glass 11, a light exposure section 12 and a shading correction board 15. FIG. 18 shows a shading correction board 10 and a second reading section 22.

As shown in FIG. 17, in the first reading section, the distance L1 which is the distance between the document surface and the light exposure section 12 is longer than the distance L2 which is the distance between the light exposure section 12 and the shading correction board 15. Further, the document glass 11 shown by the shaded are in the figure is coated with an embrocation for preventing dust from attaching to the glass. The read value will be small overall because the amount of light reaching to the paper surface decreases due to the influence of the distance and the coating of the embrocation.

As shown in FIG. 18, in the second reading section 22, the distance L3 which is the distance between the document surface and the second reading section 22 is shorter than the distance L4 which is the distance between the second reading section 22 and the shading correction board 10. Therefore, the output value of high brightness is a great value. Thus, there is a possibility that the tone property of the highlighted portion of the document cannot me expressed. Further, because the second reading section 22 is a contact type image sensor, there is a possibility that the variation in the reading property due to the assembly error is great.

As described above, when the shading correction is carried out to the read values of the first reading section and the second reading section, there is a problem that an appropriate correction is not necessarily carried out even when the same standard values are used.

SUMMARY OF THE INVENTION

The object of the present invention is to allow a shading correction according to each property of the two reading sections which read the front side and the back side of the document to be carried out.

In order to achieve the above object, according to a first aspect of the present invention, an image reading apparatus which reads images in a front side and a back side of a document by passing the document through the image reading apparatus once comprises a first reading section to read the front side of the document, a second reading section to read the back side of the document and an image process section to calculate a first standard value for carrying out a first shading correction to the first reading section and a second standard value for carrying out a second shading correction to the second reading section, respectively, and to carry out the first shading correction to a first image data read by the first reading section based on the calculated first standard value and to carry out the second shading correction to a second image data read by the second reading section based on the calculated second standard value.

Preferably, the image process section calculates a first correction factor from the first standard value for the first reading section and a first data obtained by reading a first shading correction board to carry out the first shading correction to the first image data read by the first reading section based on the calculated first correction factor, and calculates a second correction factor from the second standard value for the second reading section and a second data obtained by reading a second shading correction board to carry out the second shading correction to the second image data read by the second reading section based on the calculated second correction factor.

Preferably, the image process section calculates the first standard value based on a first read value obtained by the first reading section reading a chart, and calculates the second standard value based on a second read value obtained by the second reading section reading the chart.

Preferably, the image process section calculates the first standard value based on the first read value obtained by the first reading section reading the chart which includes at least a white portion or a black portion and a value which is related to the chart, and calculates the second standard value based on the second read value obtained by the second reading section reading the chart and the value which is related to the chart.

Preferably, the image process section comprises a storage section to store a table in which the first read value obtained by the first reading section reading the white portion of the chart and the second read value obtained by the second reading section reading the white portion of the chart and a white standard value are respectively related to one another, and a table in which the first read value obtained by the first reading section reading the black portion of the chart and the second read value obtained by the second reading section reading the black portion of the chart and a black standard value are respectively related to one another in advance, calculates the first standard value based on the first read value obtained by the first reading section reading the chart and the table stored in the storage section, and calculates the second standard value based on the second read value obtained by the second reading section reading the chart and the table stored in the storage section.

Preferably, the image process section comprises a storage section to store a tone property of the chart which includes at least a gray portion in advance, derives the first standard value based on the first read value obtained by the first reading section reading the chart which includes the gray portion and the tone property stored in the storage section, and derives the second standard value based on the second read value obtained by the second reading section reading the chart which includes the gray portion and the tone property stored in the storage section.

According to a second aspect of the present invention, an image reading apparatus which reads images in a front side and a back side of a document by passing the document through the image reading apparatus once comprises a first reading section to read the front side of the document, a second reading section to read the back side of the document, a storage section to store a first standard value for carrying out a first shading correction to the first reading section and a second standard value for carrying out a second shading correction to the second reading section and an image process section to carry out the first shading correction to a first image data read by the first reading section based on the first standard value and to carry out the second shading correction to a second image data read by the second reading section based on the second standard value.

Preferably, the image process section calculates a first correction factor from the first standard value and a first data obtained by reading a first shading correction board to carry out the first shading correction to the first image data read by the first reading section based on the calculated first correction factor, and calculates a second correction factor from the second standard value and a second data obtained by reading a second shading correction board to carry out the second shading correction to the second image data read by the second reading section based on the calculated second correction factor.

Preferably, the image process section calculates the first standard value based on a first read value obtained by the first reading section reading a chart, and calculates the second standard value based on a second read value obtained by the second reading section reading the chart.

Preferably, the image process section calculates the first standard value based on the first read value obtained by the first reading section reading the chart which includes at least a white portion or a black portion and an ideal value which is related to the chart, and calculates the second standard value based on the second read value obtained by the second reading section reading the chart and the ideal value which is related to the chart.

Preferably, the storage section stores a table in which the first read value obtained by the first reading section reading the chart and the second read value obtained by the second reading section reading the chart and a standard value are respectively related to one another, and the image process section calculates the first standard value based on the first read value obtained by the first reading section reading the chart and the table stored in the storage section, and calculates the second standard value based on the second read value obtained by the second reading section reading the chart and the table stored in the storage section.

Preferably, the storage section stores a tone property of the chart which includes a gray portion in advance, and the image process section calculates the first standard value based on the first read value obtained by the first reading section reading the chart including the gray portion and the tone property stored in the storage section and calculates the second standard value based on the second read value obtained by the second reading section reading the chart including the gray portion and the tone property stored in the storage section.

According to a third aspect of the present invention, an image process method using an image reading apparatus which comprises a first reading section to read a first side of a document and a second reading section to read a second side of the document and which reads a front side and a back side of the document by passing the document through the image reading apparatus once, the method comprises deciding a first standard value for carrying out a first shading correction to the first reading section and a second standard value for carrying out a second shading correction to the second reading section and carrying out the first shading correction to a first image data read by the first reading section based on the first standard value and carrying out the second shading correction to a second image data read by the second reading section based on the second standard value.

Preferably, in the carrying out the first shading correction, a first correction factor is calculated from the first standard value and a first data obtained by reading a first shading correction board to carry out the first shading correction to the first image data read by the first reading section based on the calculated first correction factor, and in the carrying out the second shading correction, a second correction factor is calculated from the second standard value and a second data obtained by reading a second shading correction board to carry out the second shading correction to the second image data read by the second reading section based on the calculated second correction factor.

Preferably, in the deciding, the first standard value is decided based on a first read value obtained by the first reading section reading a chart and the second standard value is decided based on a second read value obtained by the second reading section reading the chart.

Preferably, in the deciding, the first standard value is decided based on a first read value obtained by the first reading section reading a chart which includes at least a white portion or a black portion and an ideal value which is related to the chart and the second standard value is decided based on a second read value obtained by the second reading section reading the chart and the ideal value which is related to the chart.

Preferably, the image reading apparatus further comprises a storage section to store a table in which a first read value obtained by the first reading section reading a chart and a second read value obtained by the second reading section reading the chart and a standard value are respectively related to one another, and in the deciding, the first standard value is decided based on the first read value obtained by the first reading section reading the chart and the table stored in the storage section and the second standard value is decided based on the second read value obtained by the second reading section reading the chart and the table stored in the storage section.

Preferably, the image reading apparatus further comprises a storage section to store a tone property of a chart which includes a gray portion, and in the deciding, the first standard value is decided based on a first read value obtained by the first reading section reading the chart which includes the gray portion and the tone property stored in the storage section and the second standard value is decided based on a second read value obtained by the second reading section reading the chart which includes the gray portion and the tone property stored in the storage section.

According to the first to the third aspects of the present invention, shading corrections according to the property of each reading section for the front side and the back side of the document can be carried out.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DESCRIPTION OF THE PREFERRED EMBODIMENTS

Hereinafter, the structure and the operation of the best mode regarding the image reading apparatus according to the present invention will be described in detail by using the drawings.

[First Embodiment]

Figure 1:
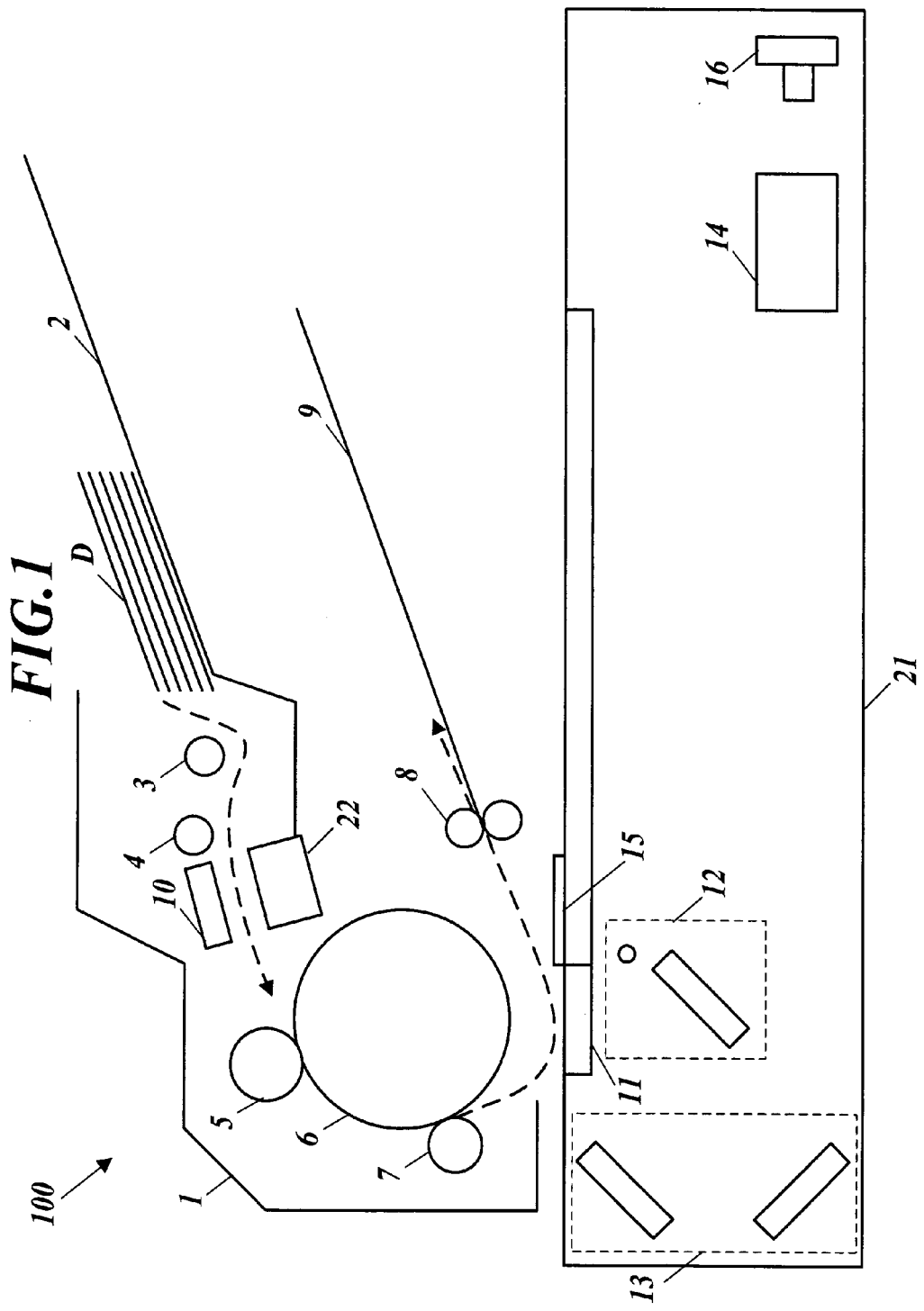
FIG. 1 is a diagram showing an outline structure of an image reading apparatus of an embodiment according to the present invention.

As shown in FIG. 1, an image reading apparatus 100 comprises an automatic document conveyance device 1 and a first reading section 21.

The automatic document conveyance device 1 comprises a document tray 2, an introduction roller 3, and intermediate roller 4, a first follower roller 5, a large roller 6, a second follower roller 7, a discharge roller 8, a discharge tray 9, a shading correction board 10 and a second reading section 22.

The introduction roller 3 separates the documents D placed on the document tray 2 one sheet by one sheet and conveys the documents D to the intermediate roller 4 on the conveyance rout. Before the document is conveyed by the large roller 6 and the first follower roller 5, the back side of the document D is read by the second reading section 22. Then, the document D is conveyed by the second follower roller 7 so as to follow the large roller 6. The document D passes through on the document glass 11 and is conveyed to the discharge roller 8.

The discharge roller 8 discharges the document D which is conveyed on the document glass 11 to the discharge tray 9. The document D in which the document reading process is carried out is discharged to the discharge tray 9.

The shading correction board 10 is a standard white board to be used in the shading correction which is carried out before the document D is actually read as the image data. The shading correction will be described afterwards.

The second reading section 22 is constituted with the LED (Light Emitting Diode) (omitted from the drawing) which is a light source, a lens and the CIS (Contact Image Sensor). The second reading section 22 reads the document by the LED irradiating the document D and by collecting the light which is reflected by the document D to the CIS through the lens to convert the light received at the CIS into the electric signal. The LED, the lens and the CIS are in a rod-like shape of same length and are adhesive to one another in a cluster.

The automatic document conveyance device 1 makes the document D move inside of the automatic document conveyance device 1. At that time, the front side of the document D is read by the first reading section 21 and the back side of the document is read by the second reading section 22. Here, in FIG. 1, the shading correction board 10 which corresponds with the second reading section 22 is disposed between the intermediate roller 4 and the first follower roller 5. However, the shading correction board 10 may be disposed at a position after the document is read by the first reading section 21, which is a position between the document glass 11 and the discharge roller 8. The back surface of the document D is read by this process.

The first reading section 21 comprises the document glass 11, a light exposure section 12, a mirror unit 13, a lens 16, a shading correction board 15 and the CCD (Charge Couple Devices) 16.

In the first reading section 21, when the document D passes through on the document glass 11, the side of the document in the document glass 11 side is exposed to light by the light exposure section 12. The reflection light of the document reflected from the document D by the light exposure by the light exposure section 12 is collected by the lens 16 through the mirror unit 13, and is converted as electric signal in the first reading unit 21. The front side of the document D is read by this process.

Figure 2:
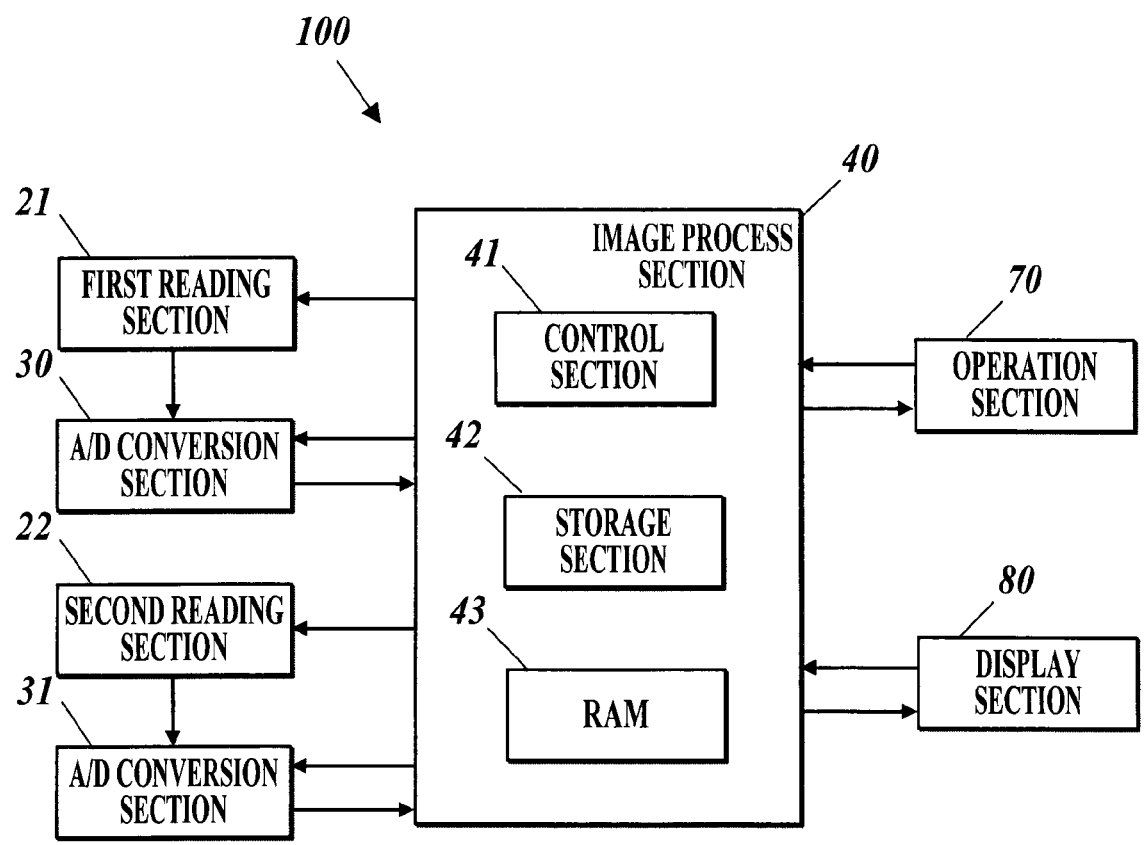
FIG. 2 is a functional block diagram of the image reading apparatus of FIG. 1.

FIG. 2 is a block diagram showing the main functional structure of the image reading apparatus 100.

The first reading section 21 reads the front side of the document and the second reading section 22 reads the back side of the document. The first reading section 21 and the second reading section 22 output the image signal (analog signal) of the read document image to the A/D conversion sections 30 and 31, respectively.

The A/D conversion sections 30 and 31 converts the analog signal which is input from each of the first reading section 21 and the second reading section 22 into a predetermined digital image signal and outputs the digital image signals to the image process section 40.

The image process section 40 comprises a control section 41, a storage section 42, the RAM (Random Access Memory) 43 and the like.

The control section 41 includes the CPU (Central Processing Unit). The control section 41 reads the control program stored in the storage section 42 to expand in the work area formed in the RAM 43, and integrally controls each section of the image reading apparatus 100 according to the expanded program.

Moreover, the control section 41 reads various types of programs stored in the storage section 42 to expand in the work area formed in the RAM 43, and executes various types of processes including the after mentioned shading correction standard value deciding process and the shading correction process according to the expanded programs.

The storage section 42 is constituted with a non-volatile semiconductor memory or the like, and stores various types of control programs and various types of process programs which are to be executed by the control section 41 and the parameters, data and the like which are needed for the execution of such programs. Further, the storage section 42 also stores the standard values for the shading correction. Particularly, the storage section 42 stores the white standard value and the black standard value with respect to the first reading section 21 and the white standard value and the black standard value with respect to the second reading section 22 which are decided in the after mentioned embodiment. The stored standard value is used for calculating the shading correction factor. The calculated shading correction factor is also stored in the storage section 42 and is used at the time of shading correction.

The RAM 43 forms the storage region to temporarily store various types of programs read from the storage section 42 in various types of processes which are executed and controlled by the control section 41, the input or output data, the parameter and the like.

The operation section 70 comprises various types of function keys such as the start key to give an instruction to carry out the image reading, the number keys to input each value which is used at the time of the shading correction standard value deciding process and the like. When the function keys are operated, a corresponding operation signal is output to the control section 41.

The display section 80 comprises the LCD (Liquid Crystal Display), and displays various types of operation screens to carry out the image reading operation on the LCD.

Next, the shading correction process carried out by the image process section 40 will be described.

The shading correction is a correction which is carried out to resolve the irregularity in brightness which occurs due to the reading section, such that the end portion of the image is darker comparing to the center portion of the image in the image data read by the reading section. The shading correction is a correction to make the entire image have equal brightness in average.

Figure 3:
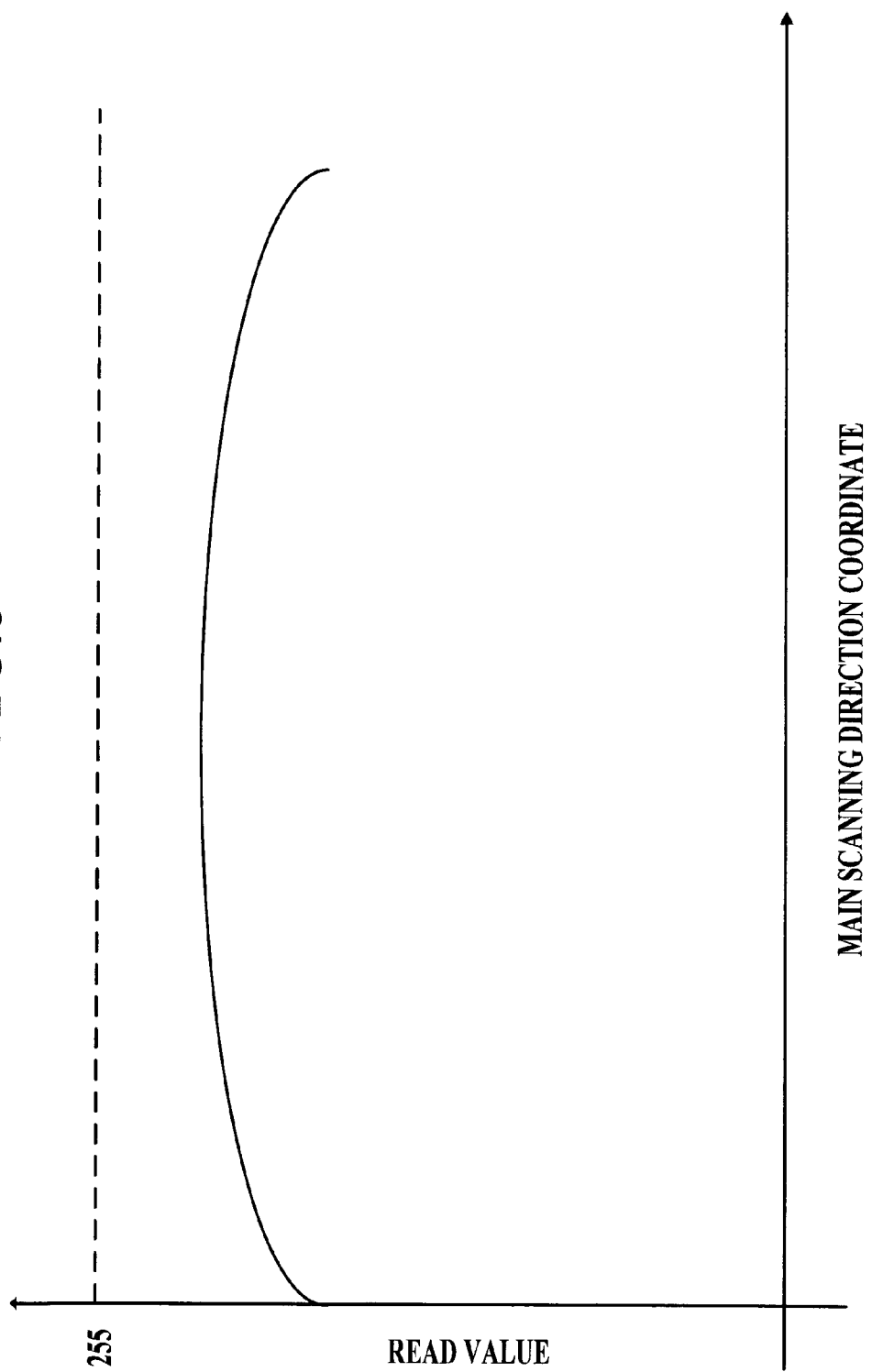
FIG. 3 is a diagram showing a read value of the CCD in a main scanning direction.

FIG. 3 is a diagram showing the read value of the CCD 16 in the main scanning direction when the CCD 16 read the shading correction board 15 which is the standard white board. The CCD 16 constitutes the first reading section 21.

As shown in FIG. 3, the value read by the CCD 16 is not consistent even within one line because of the irregularity of the light amount of the light source, the variability of the reading performance of the CCD 16 and the like.

When the image reading is indicated by the operation section 70, light is irradiated to the shading correction board 15 by the light exposure section 12 and the reflected light is read by the CCD 16 to carry out sampling before the document image is read. The data in which the sampling is carried out is stored in the storage section 42. Then, the sampling is carried out again to the data and is added to the data stored in the storage section 42. This process is repeated. Finally, the sampling data is averaged by being divided by the number of times of sampling.

The correction factor is calculated for each pixel so that the averaged sampling data becomes the white standard value which is set.

For example, when Rs denotes the read data of the shading correction board 15 of a pixel and when Ro denotes the white standard value of the reading level of the shading correction board 15, the correction factor Rh is calculated by the formula (1) shown below.

$$Rh = Ro/Rs \tag{1}$$

The calculation of formula (1) is carried out for each pixel, and the calculated correction factor is retained in the storage section 42.

When the image is to be read, the image level of the read image is corrected by the previously calculated correction factor. That is, when Ri denotes the actual read value, the value Ro after the correction is calculated by the formula (2) shown below.

$$Ro = Ri \times Rh \tag{2}$$

In such way, the irregularity in brightness can be resolved. An example of the correction in the white side is described above. However, the shading correction in the black side is carried out similarly. That is, the shading correction is carried out by carrying out the sampling by the CCD 16 reading the image in a condition where the light exposure section 12 is turned off and by calculating the correction factor from the set black standard value.

The shading correction in the first reading section 21 is described above in detail. The shading correction is carried out similarly in the second reading section 22. In the second reading section 22, the shading correction board 10 is read by the CIS and the shading correction factor is calculated from the read data and the white standard value to be stored in the storage section 42. The shading correction is carried out at the time when the document is being read by using the shading correction factor. Further, the correction of black level is carried out by calculating the correction factor from the read data read by the CIS in the condition where the LED is turned off and the black standard value.

Because the correction is carried out by setting the same white standard value for the read image of both front side and back side of the document D in the convention art, the process of the shading correction cannot deal with the above described properties of the first reading section 21 and the second reading section 22.

In the image reading apparatus 100, the standard values of the shading correction is used according to the first reading section 21 and the second reading section 22.

Figure 4:
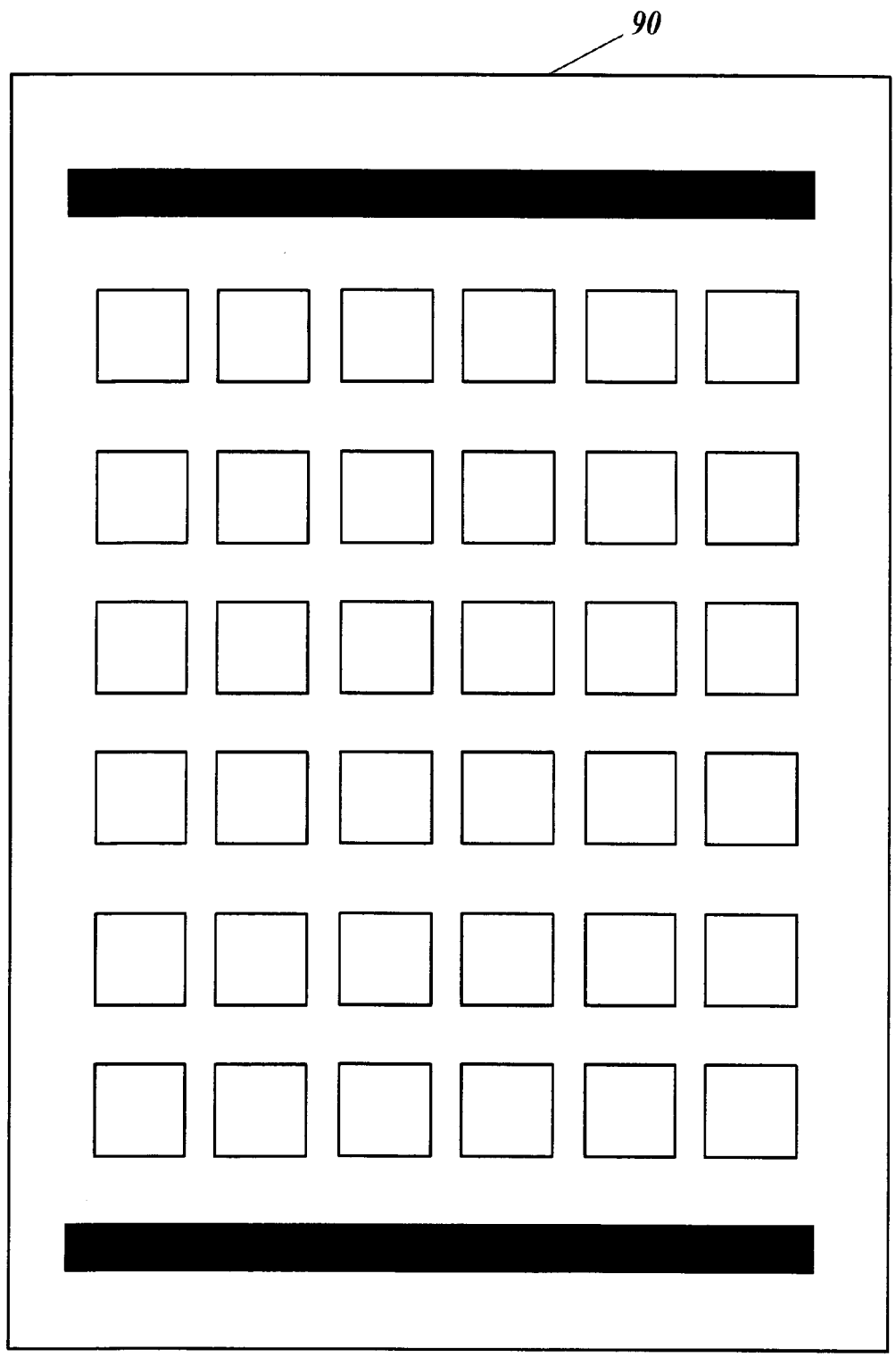
FIG. 4 is an example of a chart which is to be read by a first reading section and a second reading section of FIG. 1.
Figure 5:
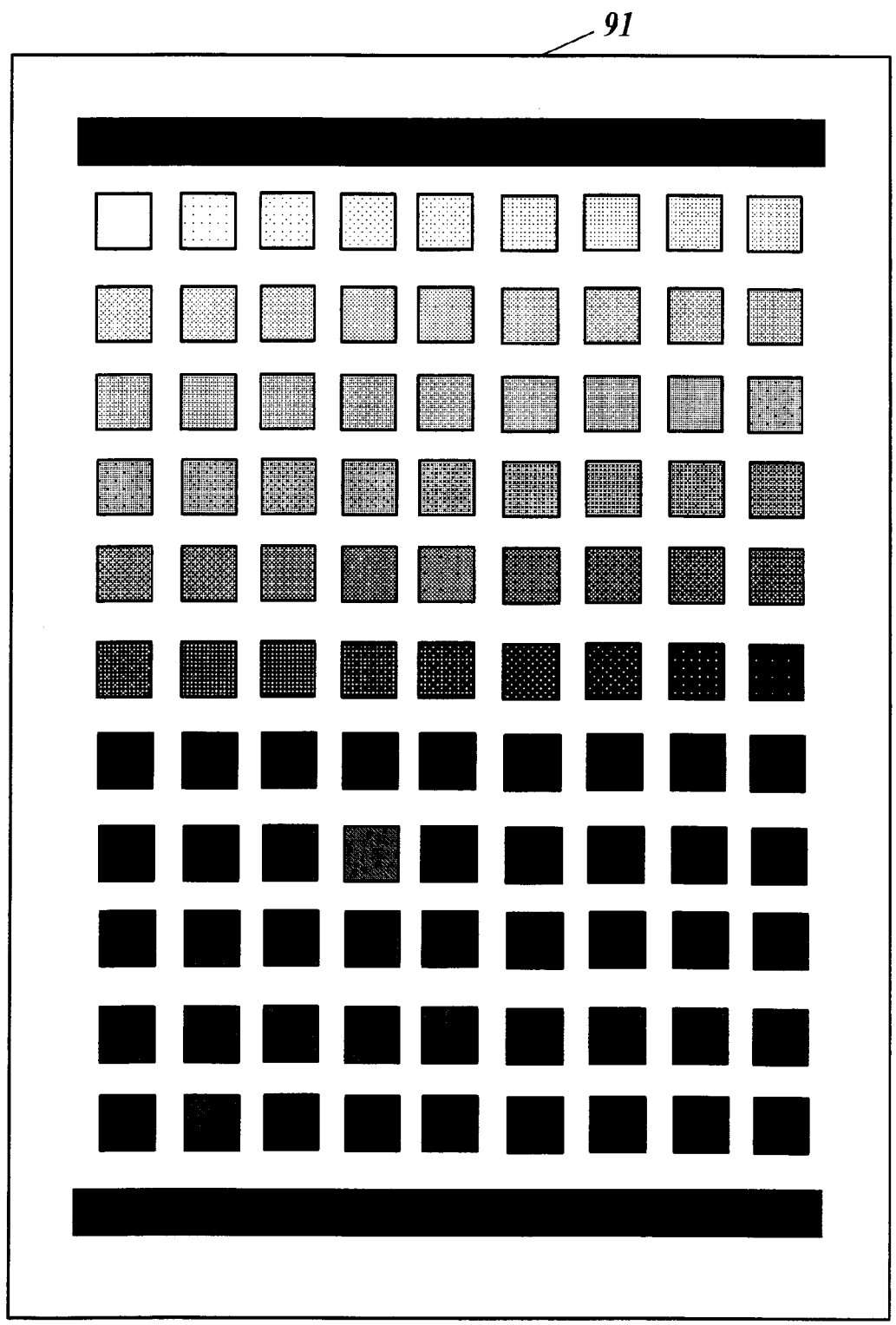
FIG. 5 is an example of a chart which is to be read by the first reading section and the second reading section of FIG. 1.

FIGS. 4 and 5 are examples of chart 90 and chart 91 used to decide the white standard value and the black standard value in the image reading apparatus 100. For example, the chart 90 including at least the white portion and the black portion as shown in FIG. 4 and the chart 91 including the tone portion of at least the white portion, the black portion and the gray portion as shown in FIG. 5 are used.

Figure 6:
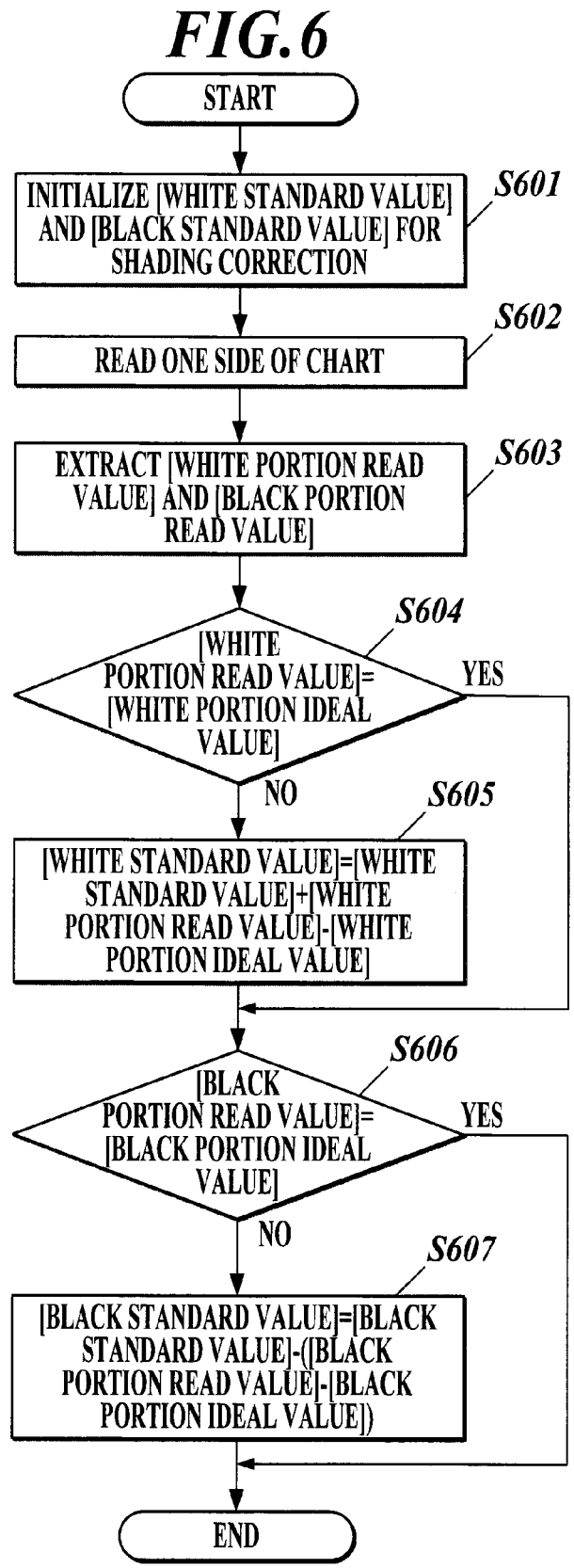
FIG. 6 is a flowchart to decide a white standard value and a black standard value for a shading correction to be executed by an image process section of FIG. 2.

FIG. 6 is a flowchart showing the first reading section standard value deciding process A which is executed by the image process section 40. The process A is executed when the indication of deciding the shading correction standard value of the first reading section 21 is input by the operation of the operation section 70, and is realized by the soft ware process which is carried out by the control section 41 and the program stored in the storage section 42 cooperating with one another.

In the process A, the standard value of the shading correction is set by comparing the read value which is obtained by making the first reading section 21 read the chart 90 and the ideal read value which is set in advance. Here, the value which is same as the read value at the time of reading of the CCDFB (CCD Flat Bed) or the value normalized so as to be in a linear state with respect to the immediate color value such as brightness, luminance and the like may be used for the ideal read value which is assumed when the chart 90 is being read.

First, a temporary standard value of white and black are set in the image process section 40 in advance (step S601). This temporary standard value may be set by using the value stored in the storage section 42 or the standard value input by the operation section 70 may be set as the temporary standard value. Next, the one-side image of the chart 90 is read by the first reading section 21, and the read value is stored in the RAM 43 (step S602).

Next, the read values of the white portion and the black portion are extracted from the read value in which the chart 90 is read (step S603). The read values of the white portion and the black portion may be obtained by the average value of the read values of the white portion and the black portion of the read chart 90 or may be calculated by the peak value of the histogram.

Subsequently, the white portion read value which is extracted and the ideal value (hereinafter, called the white portion ideal value) of the white portion of the chart 90 which is set in the storage section 42 in advance are compared to one another. When the two values are different (step S604; No), the difference is added to the temporary standard value set in step S601 to be set as the white standard value to be used for the shading correction (step S605). For example, when the white standard value is temporarily set to 230 in advance and when the white part of the chart 90 which is desired to be read as 240 is read as 235 by the first reading section, the difference of 5 is added to the temporary standard value 230 which is set in advance and the white standard value is set to 235.

In step S604, when there is no difference between the white portion read value and the white portion ideal value (step S604; Yes), the step S605 is skipped because there is no error due to the first reading section 21 and the process proceeds to step S606. That is, the temporary white standard value which is set in step S601 is used as it is.

Similarly, the black portion read value of the chart 90 which is extracted in step S603 and the ideal value (hereinafter, called the black portion ideal value) of the black portion of the chart 90 which is set in advance are compared to one another. When the two values are different (step S606; No), the difference is subtracted from the value set in S601 to be set as the black standard value to be used for the shading correction (step S607). For example, when the black standard value is temporality set to 10 in advance and when the black portion of the chart 90 which is desired to be read as 5 is read as 8 by the first reading section 21, the difference 3 is subtracted from the temporary black standard value 10 which is set in advance and the black standard value is set to 7.

In step S606, when there is no difference between the black portion read value and the black portion ideal value, the step S607 is skipped because there in no error due to the reading device as mentioned above (step S606: YES) and the process is finished. That is, the temporary black standard value which is set in step S601 is used as it is.

The white standard value and the black standard value which are decided by the above process are stored in the storage section 42 and the values will be used to calculate the shading correction factors in the shading correction as described above.

The flow to simultaneously decide both the white standard value and the black standard value of the first reading section 21 is shown in the flowchart of FIG. 6. However, the white standard value can be decided independently and the black standard value can be decided independently.

Figure 7:
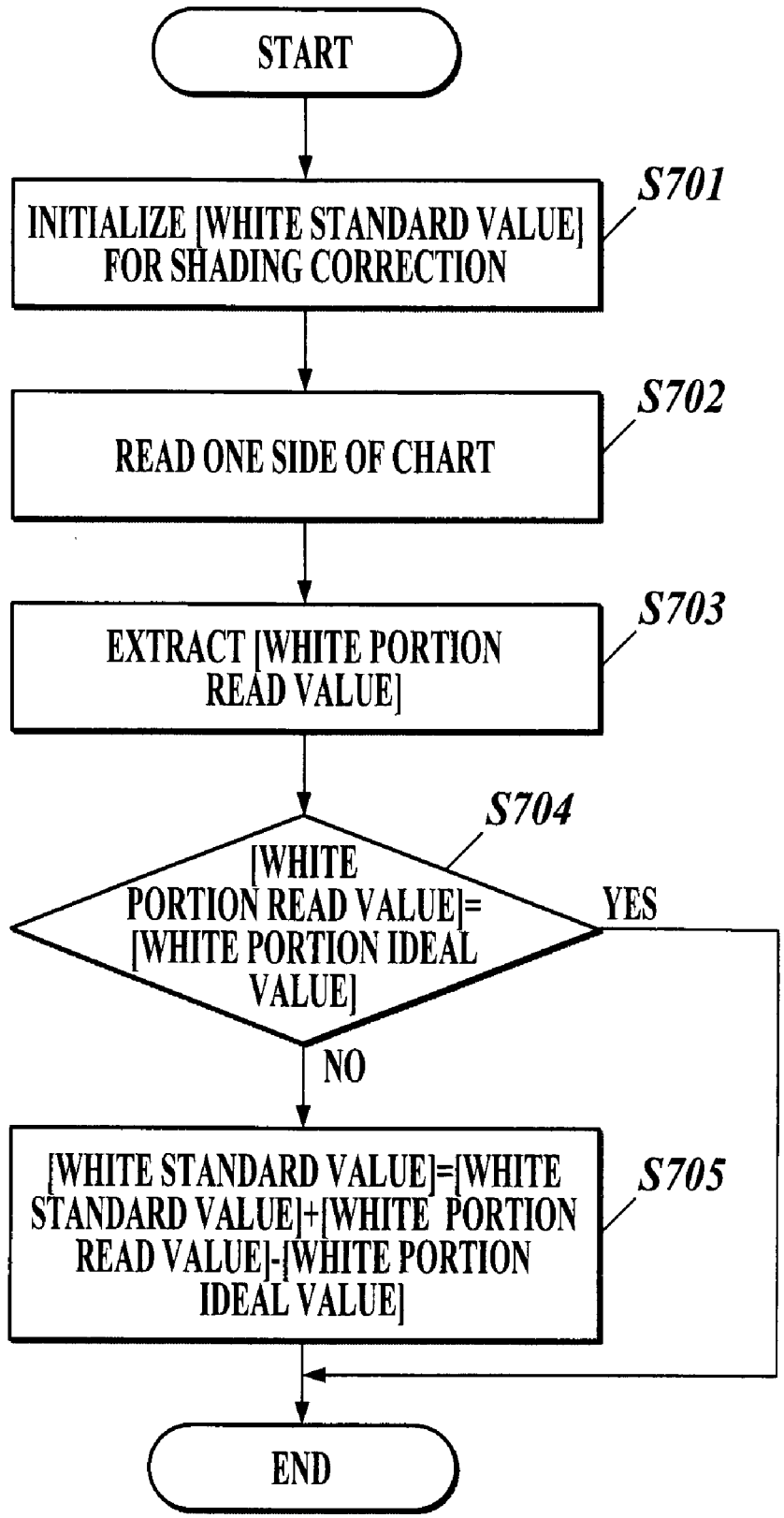
FIG. 7 is a flowchart to decide the white standard value for the shading correction to be executed by the image process section of FIG. 2.

FIG. 7 is a flowchart showing the process which is carried out when the white standard value is decided independently. Steps S701 to S705 correspond to steps S601 to S605, respectively.

Figure 8:
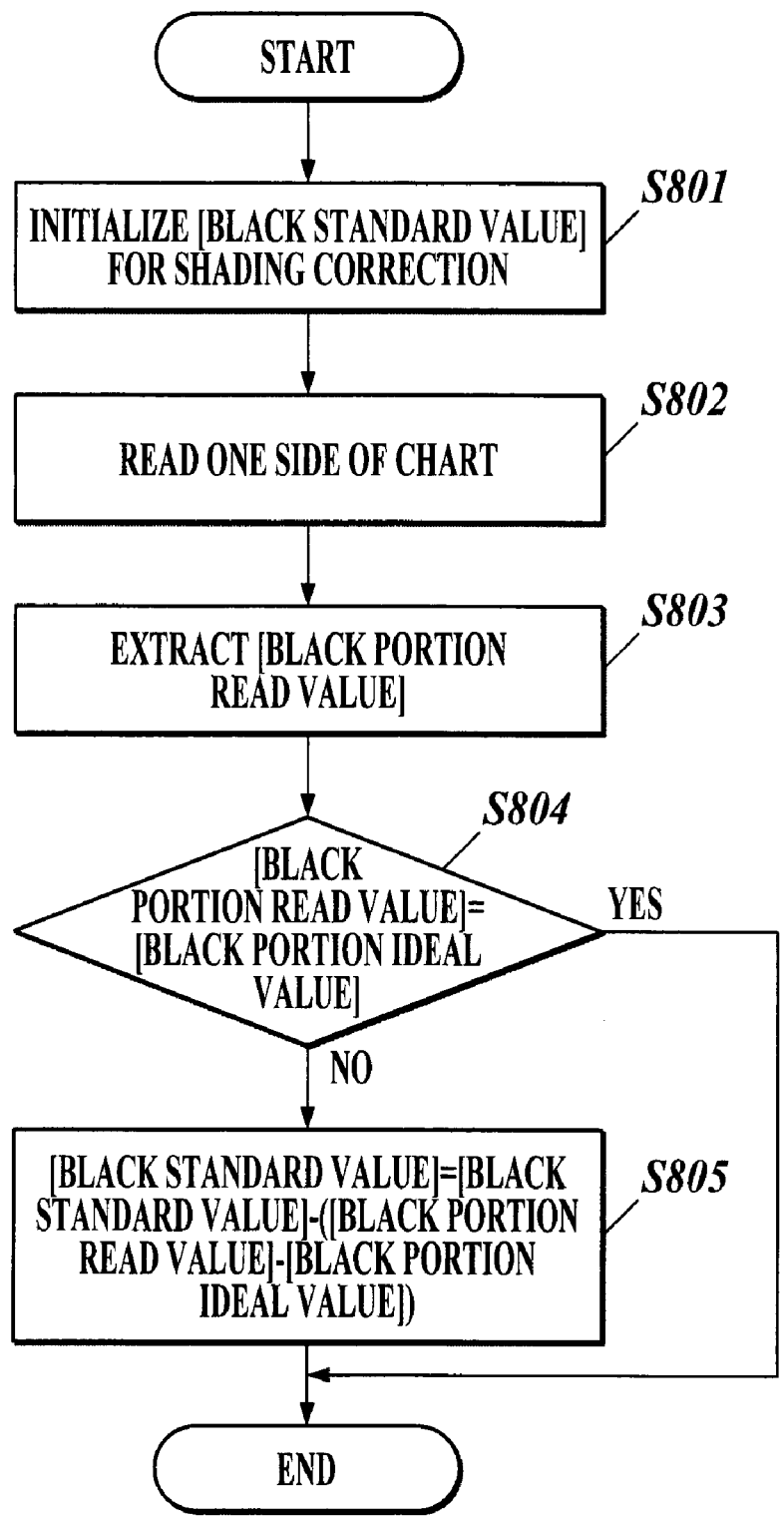
FIG. 8 is a flowchart to decide the black standard value for the shading correction to be executed by the image process section of FIG. 2.

FIG. 8 is a flowchart showing the process which is carried out when the black standard value is decided independently. Steps S801 to S803 correspond to steps S601 to S603, respectively. Step S804 and step S805 correspond to step S606 and step S607, respectively.

As for the second reading section 22, the white standard value and the black standard value are decided by the approximately similar process.

That is, when the indication to decided the shading correction standard value of the second reading section 22 is input by the operation of the operation section 70, the second reading section standard value deciding process A is executed by the control section 41 of the image process section 40 and the program stored in the storage section 42 cooperating with one another. In the second reading section standard value deciding process A, first, the one-side image of the chart 90 will be read by the second reading section 22 in step S602 of FIG. 6. Further, in step S603, the read value of the white portion and the black portion are extracted from the read value which is read by the second reading section 22. The process after step S604, that is the process in which the standard value is decided based on the read value extracted by the second reading section 22 in the image process section 40 is same as the first reading section standard value deciding process A.

Figure 17:
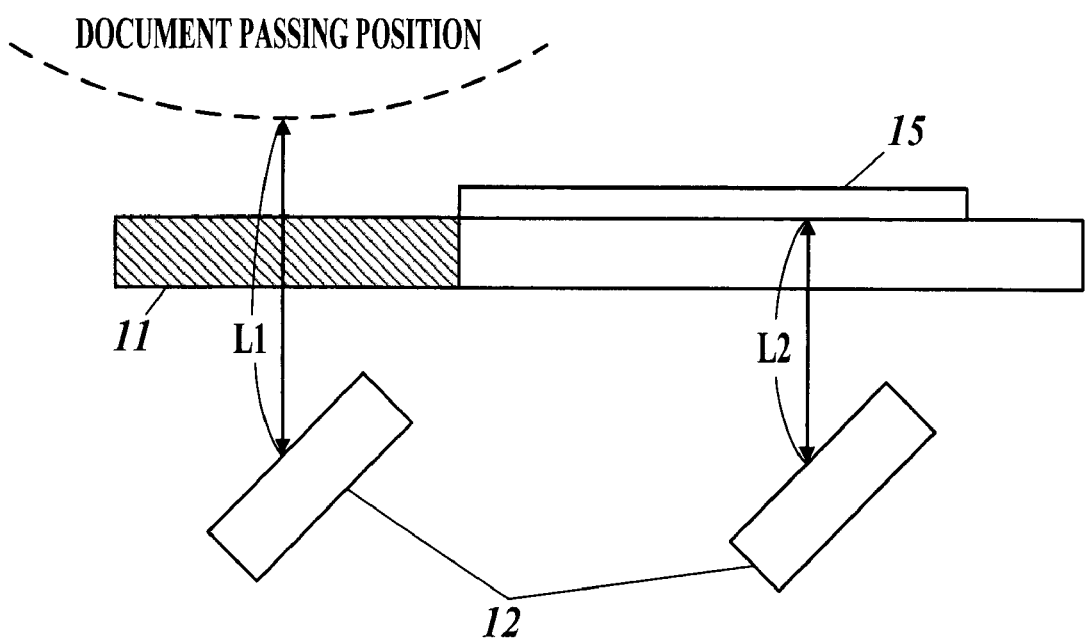
FIG. 17 is an enlarged diagram of the first reading section of the image reading apparatus.
Figure 18:
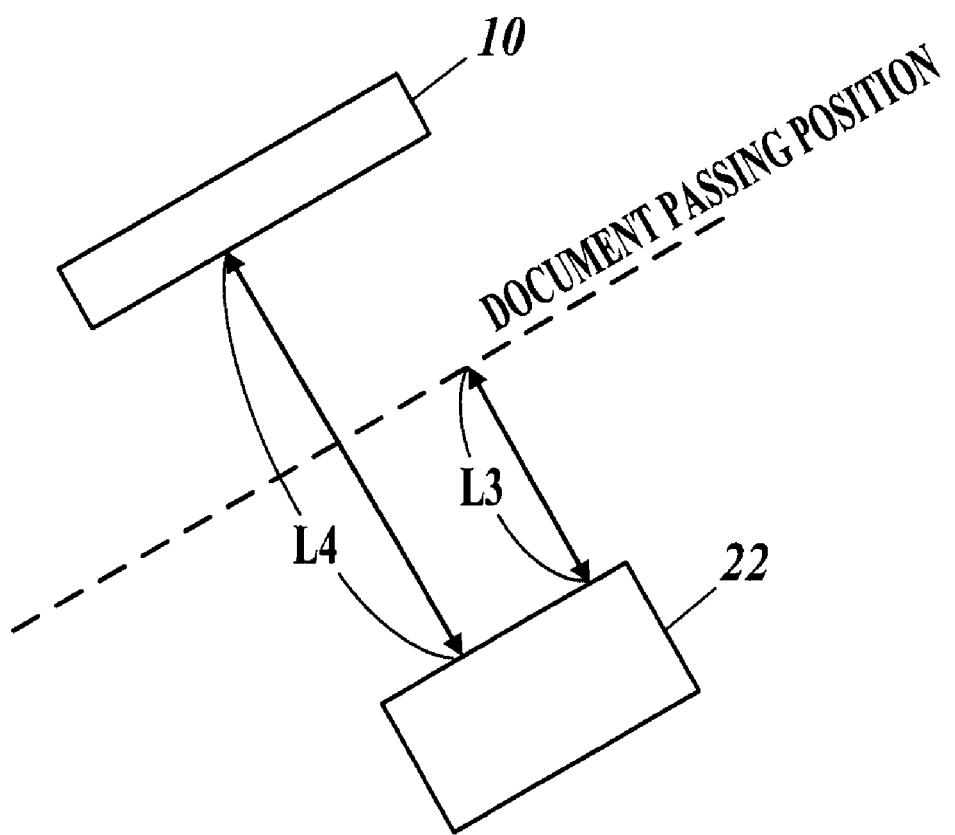
FIG. 18 is an enlarged diagram of the second reading section of the image reading apparatus.

By the above described manner, the appropriate white standard value and black standard value according to the property of the reading section are generated for each of the first reading section 21 and the second reading section 22. As a result, a trouble based on the reading error which occurs due to the structural property of each of the first reading section 21 and the second reading section 22 as described by referring to FIGS. 17 and 18 can be resolved.

[Second Embodiment]

Next, the second embodiment of the present invention will be described. Here, the structure of the image reading apparatus 100 in the second embodiment is approximately similar to that described in the first embodiment. Therefore, the explanation is omitted.

In the first embodiment, the technique is to decide the white standard value and the black standard value to be used for the shading correction by the difference of the ideal value and the read value of the white portion and the black portion of the chart 90. However, regarding the deriving of the standard values, the white standard value and the black standard value are decided by using the table stored in the storage section 42 in advance in the second embodiment.

Figure 9:
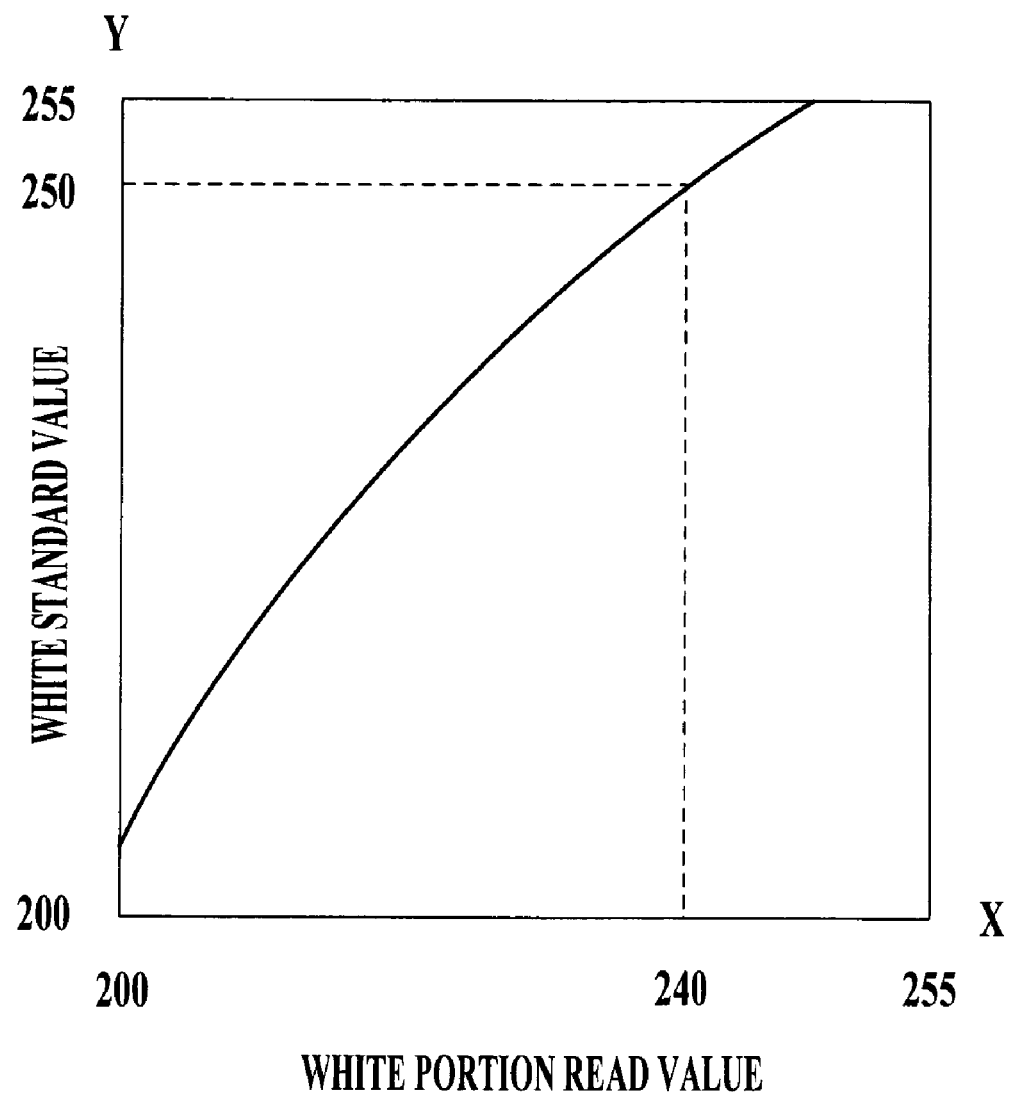
FIG. 9 is a table to decide the white standard value for the shading correction of the second embodiment.
Figure 10:
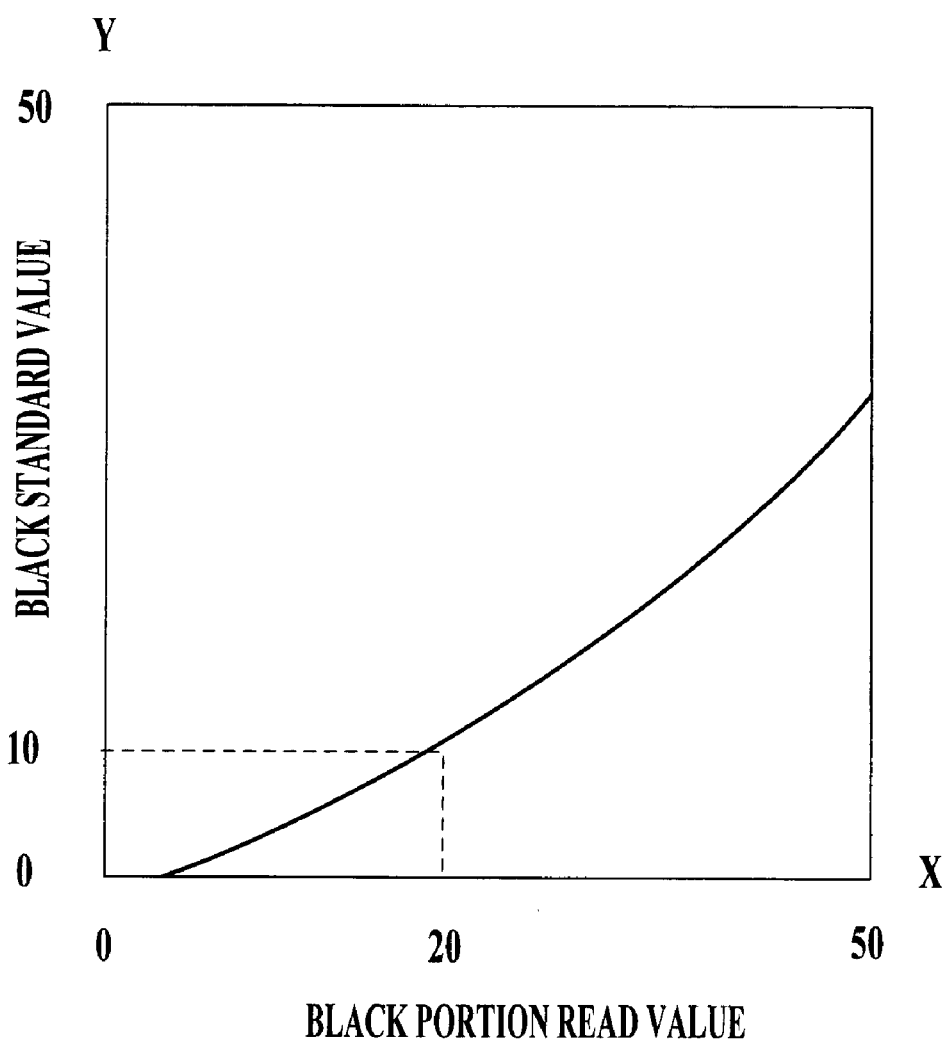
FIG. 10 is a table to decide the black standard value for the shading correction of the second embodiment.

FIGS. 9 and 10 are tables used in the second embodiment. The read value which is obtained by the white portion and the black portion of the chart 90 being read by the first reading section 21 and the second reading section 22 are to be the X-axis, and the white standard value and the black standard value to be set are to be the Y-axis.

The read values obtained by the first reading section 21 and the second reading section 22 reading the chart 90 are stored in the RAM 43. The read value is applied as the X-axis of the table stored in the storage section 42 and the value of corresponding Y-axis is decided as the white standard value and the black standard value.

For example, the white standard value of the first reading section 21 is set to 250 when the first reading section 21 reads the white portion of the chart 90 as 240 as shown in FIG. 9, and the black standard value is set to 10 when the first reading section 21 reads the black portion of the chart 90 as 20 as shown in FIG. 10.

In such way, for each of the first reading section 21 and the second reading section 22, an appropriate white standard value and black standard value according to the property of the reading sections are generated. As a result, a trouble based on the reading error which occurs by the structural property of each of the first reading section 21 and the second reading section 22 as described above by referring to FIGS. 17 and 18 can be resolved.

[Third Embodiment]

Next, the third embodiment of the present invention will be described. Here, the structure of the image reading apparatus 100 in the third embodiment is approximately same as the above description given for the first embodiment. Therefore, the description is omitted. Hereinafter, the operation of the third embodiment will be described.

Figure 11:
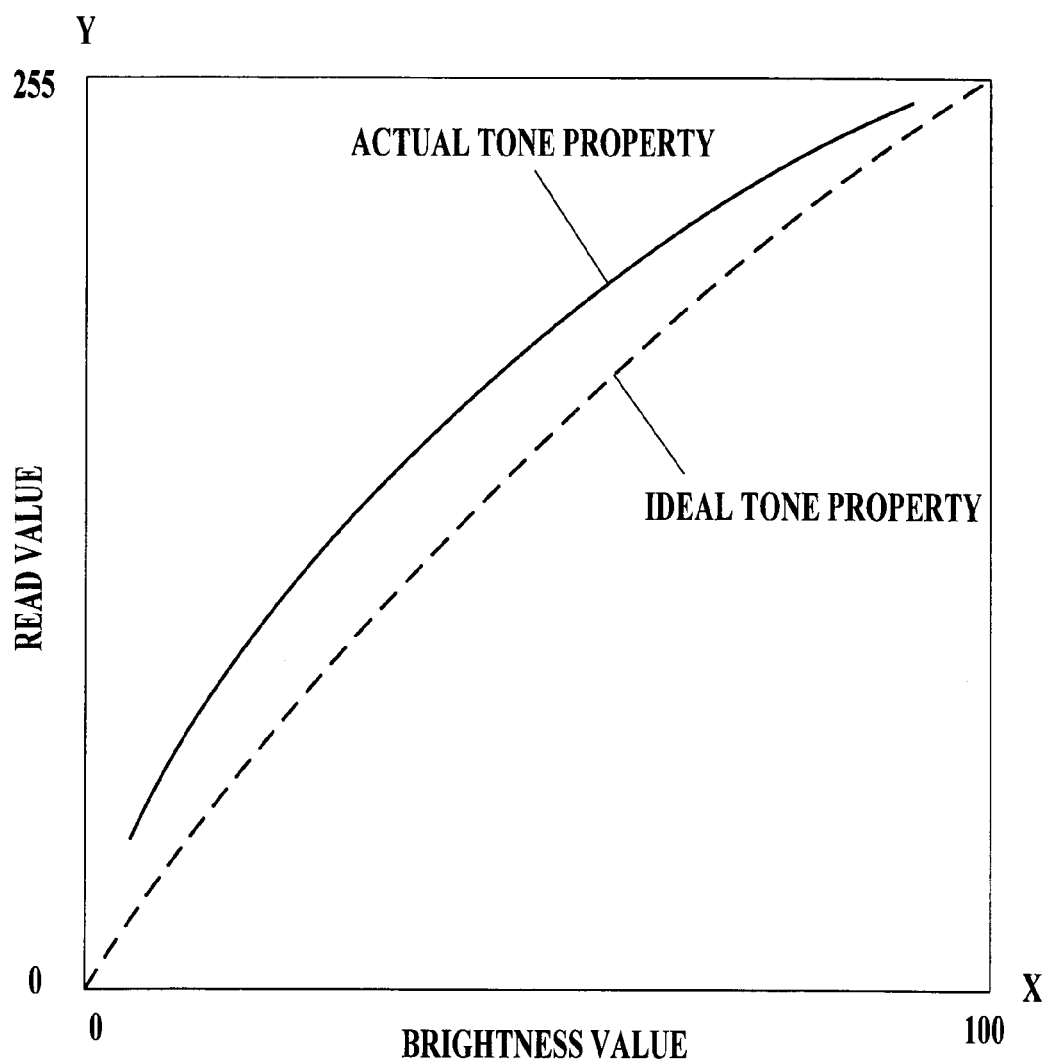
FIG. 11 is a diagram showing a tone property to decide the white standard value and the black standard value for the shading correction of the third embodiment.

In the third embodiment, the chart 91 which includes at least the white portion, the black portion or the gray portion is used, and the shading correction standard value is calculated from the difference between the ideal tone property of the chart 91 and the actually read tone property as shown in FIG. 11.

Figure 12:
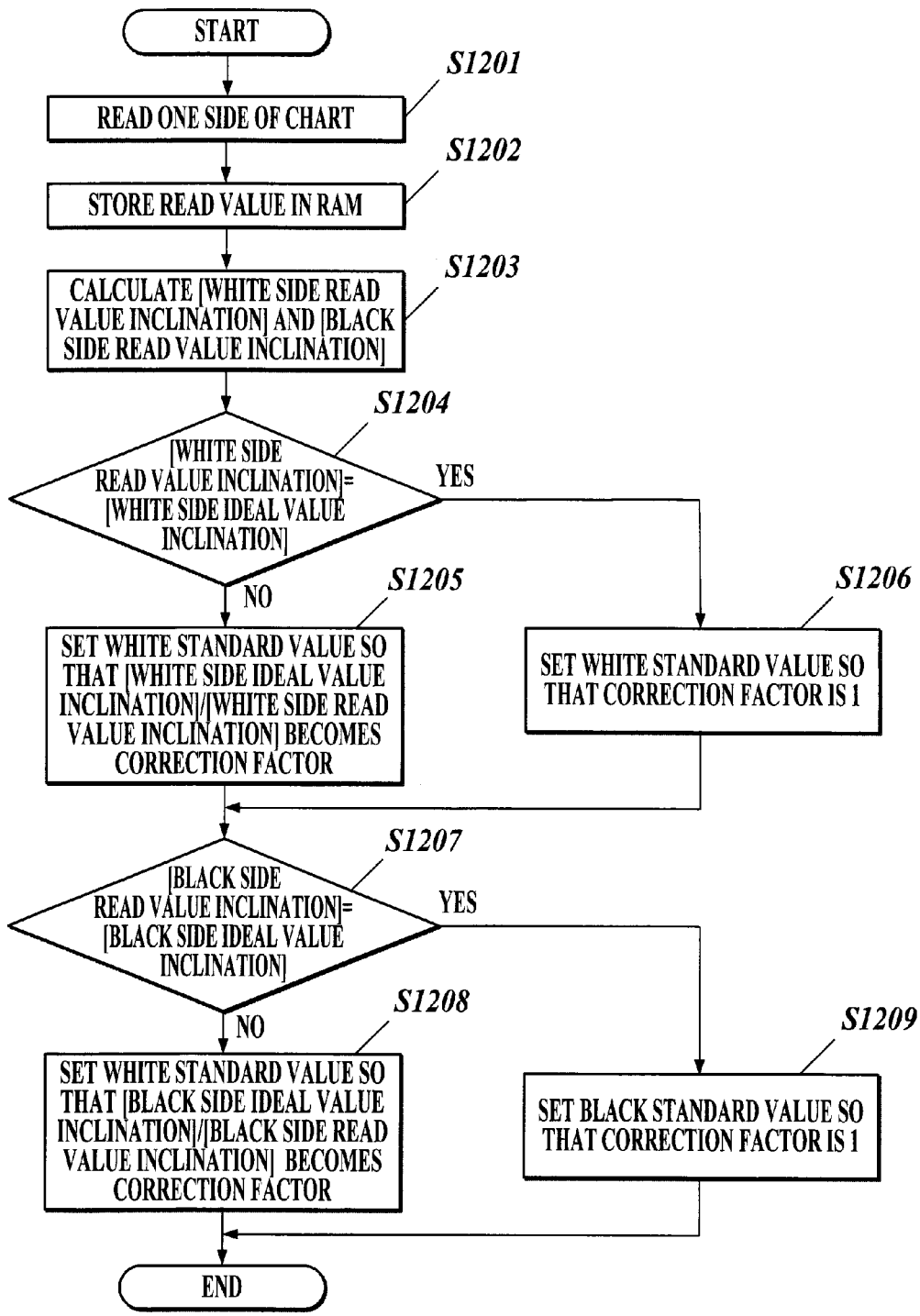
FIG. 12 is a flowchart to decide the white standard value and the black standard value for the shading correction of the third embodiment.
Figure 13:
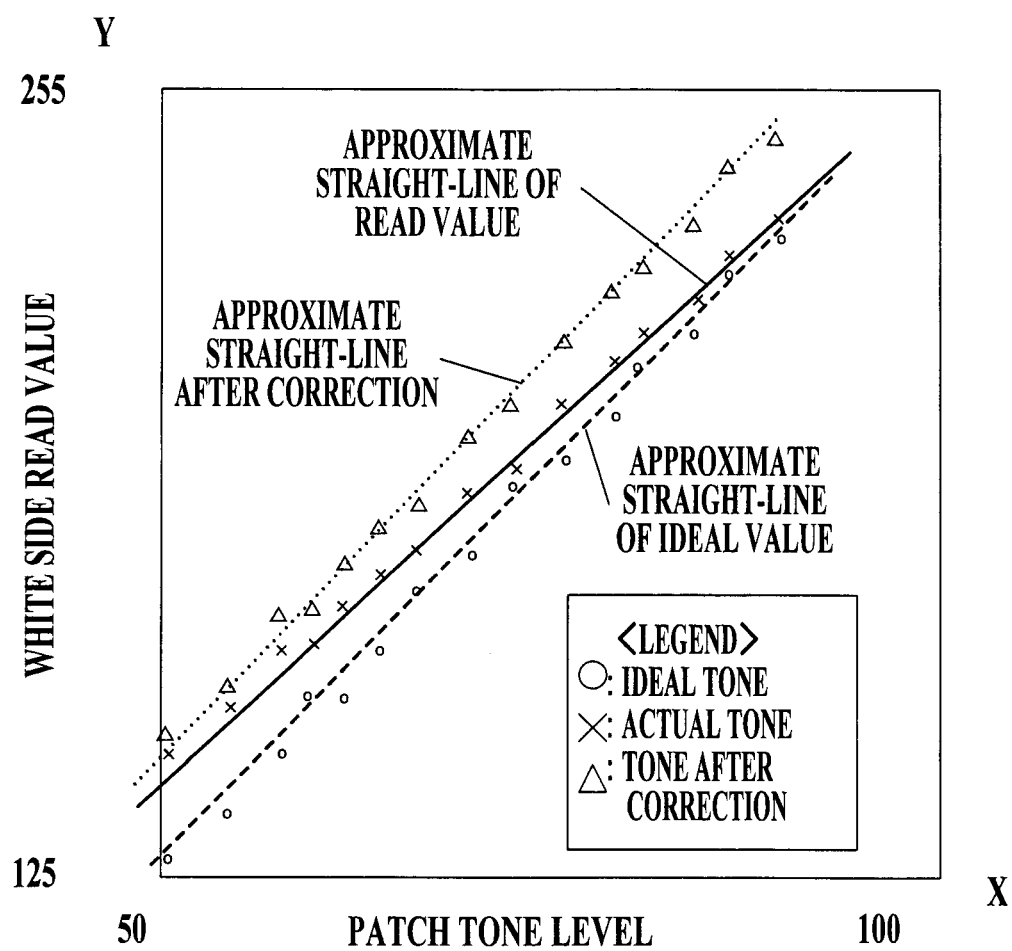
FIG. 13 is a diagram expressing the tone property of the white side before and after the shading correction is carried out in the third embodiment.

FIG. 12 is a flowchart showing the first reading section standard value deciding process B using the tone property, which is executed by the image process section 40. The process B is executed at the time when the indication to decided the shading correction standard value of the first reading section 21 is input by the operation of the operation section 70, and is realized by the soft ware process in which the control section 41 and the program stored in the storage section 42 cooperating with one another.

In the process B, the ideal tone data and the tone data actually obtained by the first reading section 21 are approximated in a linear function manner by using the least-square method, respectively, and the shading correction standard value is set by comparing the inclinations of the approximate straight-line.

First, the chart 91 is read by the first reading section 21 (step S1201). The read value of the chart 91 read by the first reading section 21 is stored in the RAM 43 (step S1202). Next, in a plane coordinate system where the X-axis is the tone level of each patch of the chart 91 and the Y-axis is the read value in the first reading section 21, the read values are divided in the white side and the black side bordering a certain tone level, and the tone property is approximated in a linear function manner by the least-square method. Then, the white side read value inclination and the black side read value inclination which are the inclinations of the approximate straight-line are calculated (step S1203).

Next, the white side read value inclination obtained in step S1203 and the white side ideal value inclination are compared to one another (step S1204). The white side ideal value inclination is an inclination of the approximate straight-line in which the ideal tone property is approximated in a linear function manner by the least-square method, and the value which is stored in the storage section 42 in advance may be used or the value which is input by the operation section 70 may be used. When the white side read value inclination and the white side ideal value inclination are different (step S1204; No), this indicates that the change in the value which is actually read by the first reading section 21 is not ideal with respect to the change in the tone level of each patch of the chart 91. In such case, the white standard value is set so that the value obtained by dividing the white side ideal value inclination by the white side read value inclination is the correction factor Rh (step S1205). As a result, the inclination of the approximate straight-line of the tone property obtained by the first reading section 21 matches with the inclination of the approximate straight-line of the ideal tone property.

When the white side read value inclination and the white side ideal value inclination are same value (step S1204; YES), the white standard value is set so that the correction factor Rh is 1 (step S1206). In such case, it is indicated that the change in the value which is actually read by the first reading section 21 is ideal with respect to the change in the tone level of each patch of the chart 91. That is, it is determined that the shading correction does not need to be carried out to the read value read by the first reading section 21.

For example, when the inclination of the approximate straight-line (the straight line shown by solid line in the figure) of the value obtained by the first reading section 21 actually reading the region in the white side of the chart 91 is more gentle than the inclination of the approximate straight-line (the straight line shown by dash line in the figure) of the ideal tone, the white standard value is decided so as to match the inclination with the approximate straight line of the ideal tone, and the correction is carried out. The approximate straight-line of the tone after the correction is shown by the dotted line in the figure.

Similarly, the black side read value inclination obtained in step S1203 and the black side ideal value inclination are compared to one another (step S1207). The black side ideal value inclination is an inclination of the approximate straight-line in which the ideal tone property is approximated in an linear function manner by the least-square method, and the value which is stored in the storage section 42 in advance may be used or the value input by the operation section 70 may be used. When the black side read value inclination and the black side ideal value inclination are different (step S1207; No), the black standard value is set so that the value obtained by dividing the black side ideal value inclination by the black side read value inclination is the correction factor Rh (step S1208).

When the black side read value inclination and the black side ideal value inclination are same value (step S1207; YES), this indicates that the change in the value which is actually read by the first reading section 21 is ideal with respect to the change in the tone level of each patch of the chart 91. In such case, the black standard value is set so that the correction factor Rh is 1 (step S1209). As a result, the inclination of the approximate strait-line of the tone property obtained by the first reading section 21 matches with the inclination of the approximate straight-line of the ideal tone property.

Figure 14:
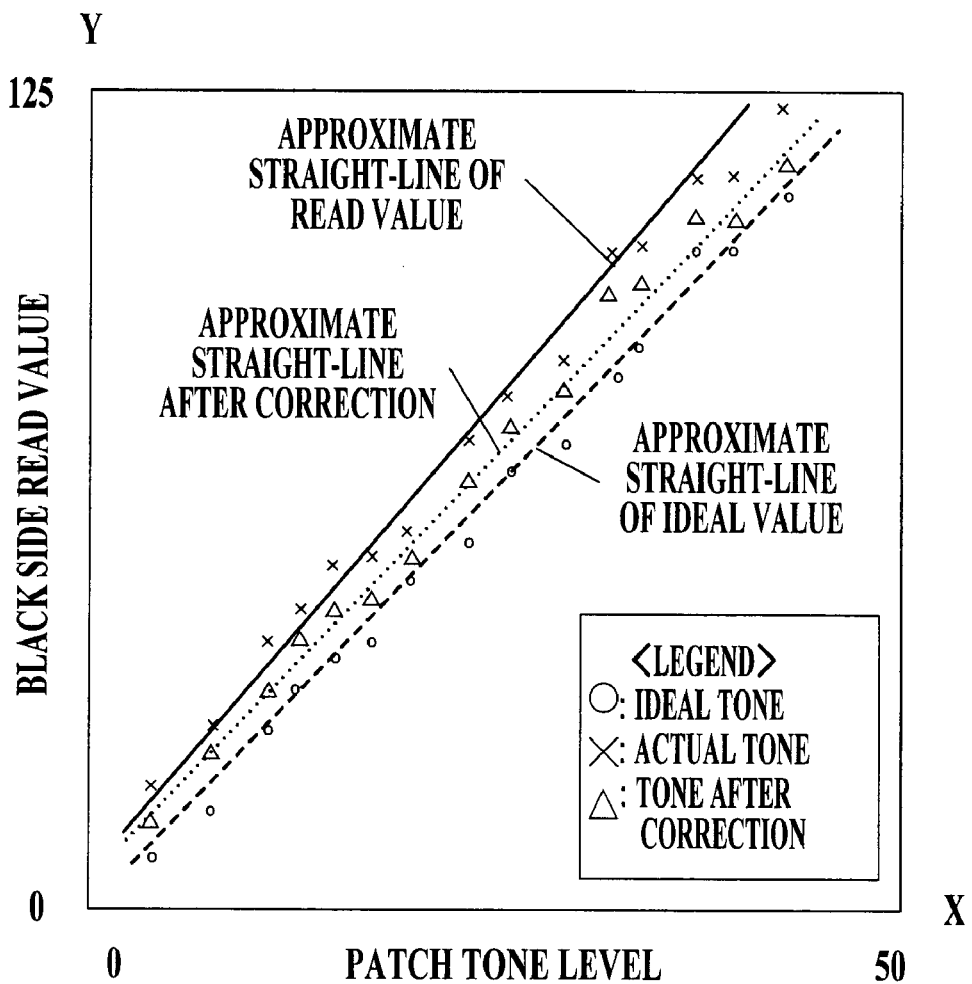
FIG. 14 is a diagram expressing the tone property of the black side before and after the shading correction is carried out in the third embodiment.

For example, when the inclination of the approximate straight-line (the straight line shown by solid line in the figure) of the value obtained by the first reading section 21 actually reading the region in the black side of the chart 91 is steeper than the inclination of the approximate straight-line (the straight line shown by dashed line in the figure) of the ideal tone as shown in FIG. 14, the black standard value is decided so as to match the inclination with the approximate straight-line of the ideal tone, and the correction is carried out. The approximate straight-line of the tone after the correction is shown by dotted line in the figure.

In the flowchart of FIG. 12, the flow to simultaneously decide the white standard value and the black standard value of the first reading section 21 is shown. However, the white standard value can be decided independently and the black standard value can be decided independently.

Figure 15:
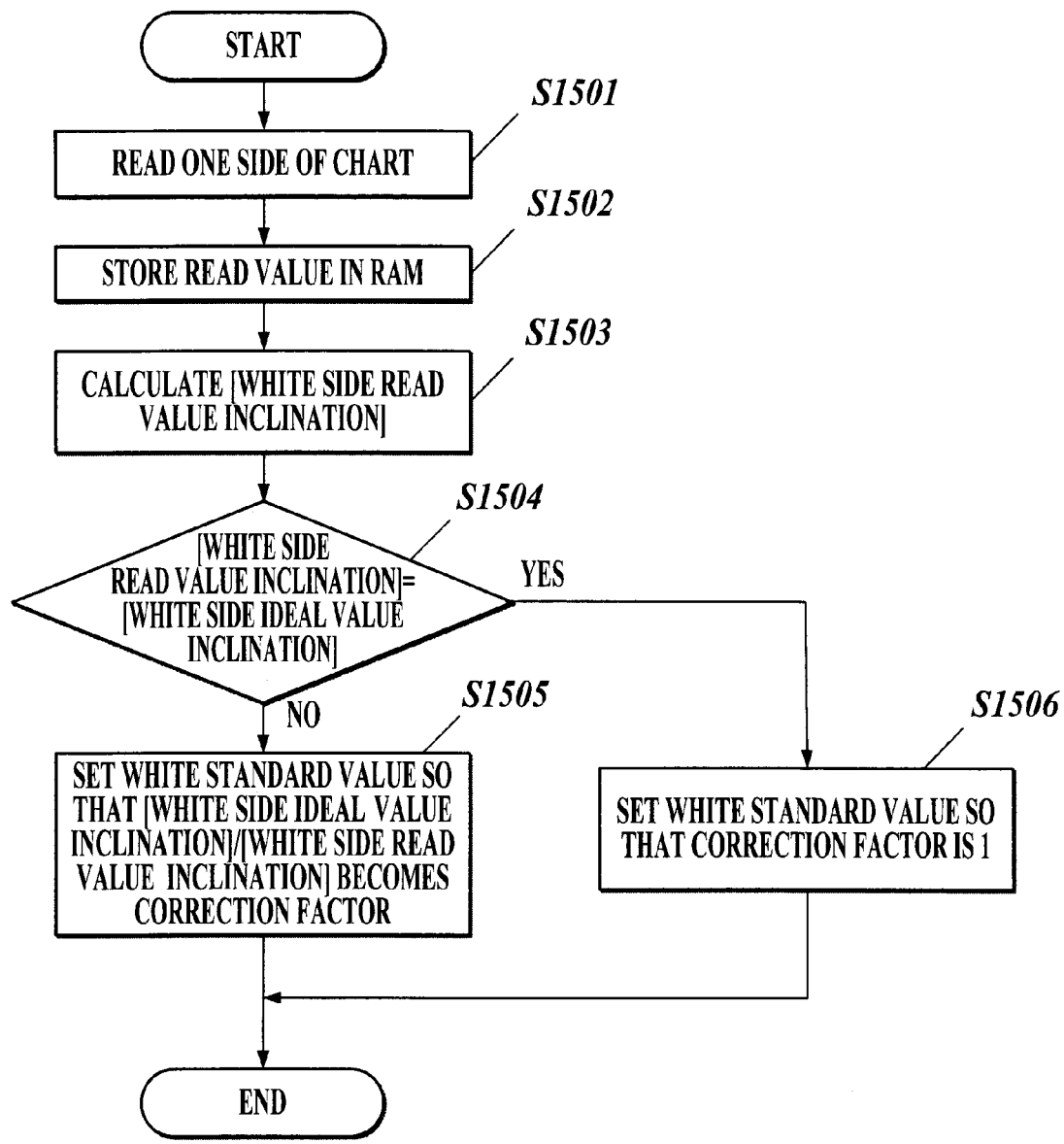
FIG. 15 is a flowchart to decide the white standard value for the shading correction in the third embodiment.

FIG. 15 is a flowchart showing the process which is carried out when the white standard value is decided independently. Steps S1501 to 1506 are processes corresponding to steps S1201 to 1206, respectively.

Figure 16:
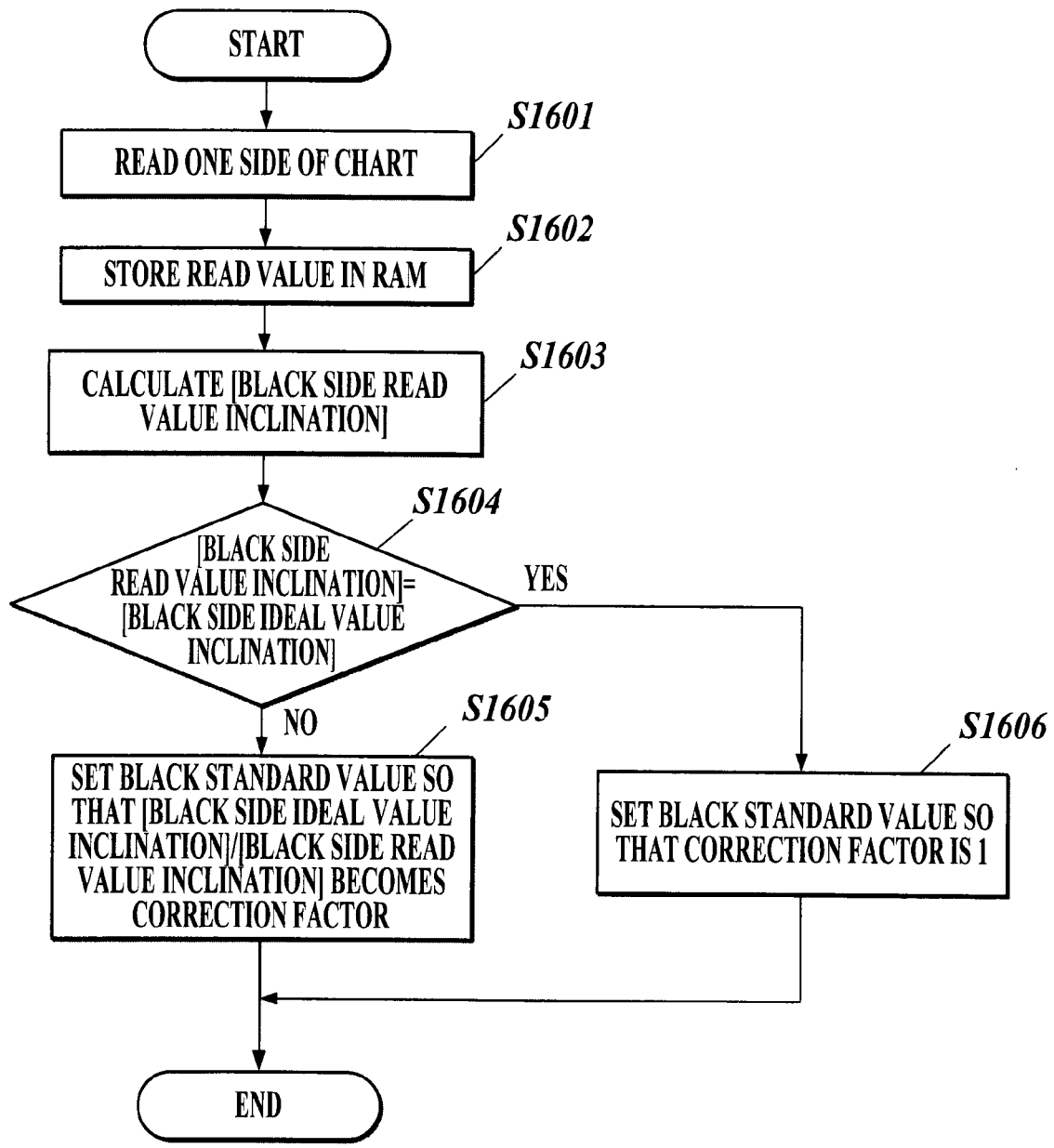
FIG. 16 is a flowchart to decide the black standard value for the shading correction in the third embodiment.

FIG. 16 is a flowchart showing the processes which is carried out when the black standard value is decided independently. Steps S1601 to S1603 are processes corresponding to steps S1201 to S1203, respectively, and steps S1604 to S1606 are processes corresponding to steps S1207 to S1209, respectively.

Both values of the white standard value and the black standard value may be changed to approximate the ideal tone property as shown in FIG. 12, or either one value of the white standard value or the black standard value may be changed to approximate the ideal tone property as shown in FIG. 15 or 16.

The white standard value and the black standard value can be decided for the second reading section 22 by the approximately same process.

That is, when an indication to decide the shading correction standard value of the second reading section 22 is input by the operation of the operation section 70, the second reading section standard value deciding process B is executed by the control section 41 of the image process section 40 and the program stored in the storage section 42 cooperating with one another. In the second reading section standard value deciding process B, first, the one-side image of the chart 91 is read by the second reading section 22 in step S1201 of FIG. 12. The process to decide the standard value based on the read value in the image process section 40 is same as the first reading section standard value deciding process B.

According to the above manner, the appropriate white standard value and black standard value according to the property of each reading section are generated for each of the first reading section 21 and the second reading section 22.

In the third embodiment, a method to approximate the tone property in a linear fraction manner is described. However, the actual tone property may be made to approximate the ideal tone property by carrying out other approximate method. For example, a method in which the shading correction standard value is derived by comparing the gamma value of the actual tone property which is obtained by the first reading section 21 and the second reading section 22 reading the chart 91 in which the tone portion is provided to the ideal gamma value and the like are suggested.

In the first embodiment to the third embodiment, the deciding method of the white standard value and the black standard value according to the property of the reading section is described.

The same method may be used to decide the white standard value and the black standard value, or the white standard value and the black standard value may be decided by using different methods. For example, the white standard value may be decided by using the method described in the first embodiment, and the black standard value may be decided by using the method described in the second embodiment.

The present U.S. patent application claims a priority under the Paris Convention of Japanese paten application No. 2007-236784 filed on Sep. 12, 2007, which shall be a basis of correction of an incorrect translation.

What is claimed is:

1. An image reading apparatus which reads images in a front side and a back side of a document by passing the document through the image reading apparatus once, comprising:

a first reading section to read the front side of the document;

a second reading section to read the back side of the document;

a storage section to store a first standard value for carrying out a first shading correction to the first reading section and a second standard value for carrying out a second shading correction to the second reading section; and an image process section to carry out the first shading correction to a first image data read by the first reading section based on the first standard value and to carry out the second shading correction to a second image data read by the second reading section based on the second standard value, wherein the storage section stores a table in which the first read value obtained by the first reading section reading a chart and the second read value obtained by the second reading section reading the chart and a standard value are respectively related to one another, and the image process section calculates the first standard value based on the first read value obtained by the first reading section reading the chart and the table stored in the storage section, and calculates the second standard value based on the second read value obtained by the second reading section reading the chart and the table stored in the storage section.

2. An image reading apparatus which reads images in a front side and a back side of a document by passing the document through the image reading apparatus once, comprising:

a first reading section to read the front side of the document;

a second reading section to read the back side of the document;

a storage section to store a first standard value for carrying out a first shading correction to the first reading section and a second standard value for carrying out a second shading correction to the second reading section; and an image process section to carry out the first shading correction to a first image data read by the first reading section based on the first standard value and to carry out the second shading correction to a second image data read by the second reading section based on the second standard value, wherein the storage section stores a tone property of a chart which includes a gray portion in advance, and the image process section calculates the first standard value based on the first read value obtained by the first reading section reading the chart including the gray portion and the tone property stored in the storage section, and calculates the second standard value based on the second read value obtained by the second reading section reading the chart including the gray portion and the tone property stored in the storage section.

3. An image process method using an image reading apparatus which comprises a first reading section to read a first side of a document and a second reading section to read a second side of the document and which reads a front side and a back side of the document by passing the document through the image reading apparatus once, the method comprising:

deciding a first standard value for carrying out a first shading correction to the first reading section and a second standard value for carrying out a second shading correction to the second reading section; and carrying out the first shading correction to a first image data read by the first reading section based on the first standard value and carrying out the second shading correction to a second image data read by the second reading section based on the second standard value, and wherein the image reading apparatus further comprises a storage section to store a table in which a first read value obtained by the first reading section reading a chart and a second read value obtained by the second reading section reading the chart and a standard value are respectively related to one another, in the deciding, the first standard value is decided based on the first read value obtained by the first reading section reading the chart and the table stored in the storage section, and the second standard value is decided based on the second read value obtained by the second reading section reading the chart and the table stored in the storage section.

4. An image process method using an image reading apparatus which comprises a first reading section to read a first side of a document and a second reading section to read a second side of the document and which reads a front side and a back side of the document by passing the document through the image reading apparatus once, the method comprising:

deciding a first standard value for carrving out a first shading correction to the first reading section and a second standard value for carrying out a second shading correction to the second reading section; and carrying out the first shading correction to a first image data read by the first reading section based on the first standard value and carrvinq out the second shading correction to a second image data read by the second reading section based on the second standard value, and wherein the image reading apparatus further comprises a storage section to store a tone property of a chart which includes a gray portion, in the deciding, the first standard value is decided based on a first read value obtained by the first reading section reading the chart which includes the gray portion and the tone property stored in the storage section, and the second standard value is decided based on a second read value obtained by the second reading section reading the chart which includes the gray portion and the tone property stored in the storage section.

5. An image reading apparatus which reads images in a front side and a back side of a document by passing the document through the image reading apparatus once, comprising:

a first reading section to read the front side of the document;

a second reading section to read the back side of the document; and an image process section to calculate a first standard value for carrying out a first shading correction to the first reading section and a second standard value for carrying out a second shading correction to the second reading section, respectively, and to carry out the first shading correction to a first image data read by the first reading section based on the calculated first standard value and to carry out the second shading correction to a second image data read by the second reading section based on the calculated second standard value, wherein the image process section comprises a storage section to store a table in which the first read value obtained by the first reading section reading the white portion of a chart and the second read value obtained by the second reading section reading the white portion of the chart and a white standard value are respectively related to one another, and a table in which the first read value obtained by the first reading section reading the black portion of the chart and the second read value obtained by the second reading section reading the black portion of the chart and a black standard value are respectively related to one another in advance, calculates the first standard value based on the first read value obtained by the first reading section reading the chart and the table stored in the storage section, and calculates the second standard value based on the second read value obtained by the second reading section reading the chart and the table stored in the storage section.

6. An image reading apparatus which reads images in a front side and a back side of a document by passing the document through the image reading apparatus once, comprising:

a first reading section to read the front side of the document;

a second reading section to read the back side of the document: and an image process section to calculate a first standard value for carrying out a first shading correction to the first reading section and a second standard value for carrying out a second shading correction to the second reading section, respectively, and to carry out the first shading correction to a first image data read by the first reading section based on the calculated first standard value and to carry out the second shading correction to a second image data read by the second reading section based on the calculated second standard value, wherein the image process section comprises a storage section to store a tone property of a chart which includes at least a gray portion in advance, derives the first standard value based on the first read value obtained by the first reading section reading the chart which includes the gray portion and the tone property stored in the storage section, and derives the second standard value based on the second read value obtained by the second reading section reading the chart which includes the gray portion and the tone property stored in the storage section.

* * * * *